(12) United States Patent
Behrendt

(10) Patent No.: US 6,683,119 B1
(45) Date of Patent: Jan. 27, 2004

(54) METHOD FOR PRODUCING POLYOLS AND POLYOLS

(75) Inventor: Gerhard Behrendt, Mahonienweg 59, D-12437 Berlin (DE)

(73) Assignees: Epik Entwicklung Und Produktion Innovativer Kunstoffe GmbH, Fuerstenwalde (DE); Gerhard Behrendt, Berlin (DE)

( * ) Notice: Subject to any disclaimer, the term of this patent is extended or adjusted under 35 U.S.C. 154(b) by 0 days.

(21) Appl. No.: 09/673,304

(22) PCT Filed: Apr. 15, 1999

(86) PCT No.: PCT/EP99/02558

§ 371 (c)(1), (2), (4) Date: Apr. 26, 2001

(87) PCT Pub. No.: WO99/54392

PCT Pub. Date: Oct. 28, 1999

(30) Foreign Application Priority Data

Apr. 16, 1998 (DE) .......................... 198 17 536

(51) Int. Cl.$^7$ ................................ C08J 11/04
(52) U.S. Cl. ........................ 521/49; 521/495

(58) Field of Search ............ 521/49, 49.5, 53, 521/86, 122, 911, 912

(56) References Cited

U.S. PATENT DOCUMENTS

| | | | | |
|---|---|---|---|---|
| 4,336,406 A | * | 6/1982 | Gerlock et al. | 568/321 |
| 5,300,530 A | * | 4/1994 | Machado et al. | 521/49 |
| 5,906,998 A | * | 5/1999 | Hoshino et al. | 521/49 |
| RE36,233 E | * | 6/1999 | Hilker et al. | 521/163 |

\* cited by examiner

Primary Examiner—Edward J. Cain
Assistant Examiner—Katarzyna Wyrozebski
(74) Attorney, Agent, or Firm—Birch, Stewart, Kolasch & Birch, LLP

(57) ABSTRACT

The present invention provides an improved process for producing polyols from polyurethane wastes. The polyols produced by that process are further used to generate polyurethanes. According to the present invention polyurethane wastes are added to a mixture of at least one diol and at least one secondary alkyl amine and reacted at temperatures in the range of 120 to 220° to produce a mixture of polyether alcohols with a dissolved or dispersed mixture of substituted ureas.

19 Claims, No Drawings

METHOD FOR PRODUCING POLYOLS AND POLYOLS

This application is the national phase under 35 U.S.C. § 371 of PCT International Application No. PCT/EP99/02558 which has an International filing date of Apr. 15, 1999, which designated the United States of America.

This invention relates to a process to produce polyols and to polyols as defined in claim 1.

BACKGROUND OF THE INVENTION

It is well known in the art to dissolve polyurethane foams in low molecular weight glycols and thus to produce polyols for the production of polyurethane rigid foams. It is further known to cleave the urethane group by strongly basic aliphatic amines to react them into substituted urea groups.

In U.S. Pat. No. 4,162,995 e.g. the simultaneous glycolysis and ammonolysis of polyurethanes by glycols, polyols, ammonia or ammonium hydroxide to form a mixture of polyols is described in which the resultant amines are either separated or further processed. According to this invention a second step in the procedure and only the use of ammonia is allowed. In U.S. Pat. No. 3,404,103 a process is described for the simultaneous alcoholysis and ammonolysis with pressure in the presence of methanol and ammonia at elevated temperature to produce a mixture of polyols and amines and ureas, resp., which are separated after cleavage of the macromolecules. To accelerate the ammonolysis strongly basic catalysts are further added to the reaction mixture. In this process a pressure step and the work-up (separation of methanol, catalysts and excess ammonia)of the polyols are necessary before further processing. The catalysis by tertiary amines of the glycolysis is described e.g. in DE-PS 27 38 572. According to U.S. Pat. No. 3,708,440 dialkanol amines and aliphatic diols are used together to solvolyse polyurethane rigid foams and polyisocyanurate foams at elevated temperatures. U.S. Pat. No. 4,110,266 relates to the reaction of polyurethane rigid foams or polyisocyanurate foams with alkanolamines, the separation of any excess of them and the use of the reaction mixture as starter of polyols. U.S. Pat. No. 3,117,940 is directed to the exclusive use of primary aliphatic amines for the aminolysis of polyurethane waste.

In the processes described in said patents it is disadvantageously attempted to enhance the comparably low basicity of the alcohols, amino alcohols and ammonia, resp., by adding further catalysts to result in useful reaction times for cleaving polyurethanes.

Object of the present invention is to provide an improved process to produce polyols from polyurethane wastes as well as polyols according to this process to produce polyurethanes from them.

According to the present invention polyurethane wastes are introduced into a mixture of at least one diol and at least one secondary alkyl amine and reacted at temperatures in the range of 120 to 220° C. by which process a mixture of polyether alcohols and substituted polyureas dissolved or dispersed in them is formed.

The ratio of diol and amine depends on several parameters among which the average molecular mass of the reactants and the type of polyurethane are most essential. It should be kept in mind that the secondary alkyl amine is both catalyst of the depolymerization reaction and reactant and hence must not be used in excess. If related to the diol and polyurethane present the amine used may be varied in a broad range of mass ratios which range about to 100:100:50 as a lower limit and 100:25:5 as an upper limit for the ratio of polyurethane:diol:amine. Advantageously, a range of 100:50:25 to 100:25:6 is used. Depending on the type of polyurethane, the reaction product nearly does not contain free amine making further work-up not neccessary.

Surprisingly it was found that polyurethane wastes, especially polyurethane foam wastes, dissolve comparably rapidly in mixtures of a diol and a secondary alkyl amine and lead to polyol mixtures so far suitable ratios of reactants are used. The polyol mixtures can be used to produce semi-rigid foams, rigid foams, coatings, or adhesives.

The polyols of the invention are favorably produced by reacting polyurethane soft foams by their successive introduction into a mixture of a lower poly(alkylene glycol) and a secondary alkyl amine at a temperature ranging from 120° C. to 220° C. Alternatively, the process of the invention may be carried out by gradually reacting polyurethane rigid foams in a mixture consisting of a lower poly(alkylene glycol) and a secondary alkyl amine at temperatures in the range of 120 to 220° C.

A further embodiment of the present invention relates to the reaction of elastic polyurethanes or microcellular elastic polyurethanes in a mixture of a diol and at least one secondary alkyl amine at temperatures in the range of 120 to 220° C. where the mixture of diol and amine is in the mass range of 1:2 to 1:9 and this mixture is in the ratio to the elastomeric polyurethane in a weight ratio up to 1:9.

Especially favored is a process according to the invention by which polyurethanes are reacted with a mixture of poly(alkylene glycol) of average molecular mass from 108 to 600 and a di-n-alkylamine with a chain length of the alkyl groups of 2 to 6 in a temperature range of 130 to 200° C. Poly(alkylene glycol) fractions having an average molecular mass of 200, 300, 400, or 600 are preferred since these fractions show to be good solvents for the foams and the substitued ureas derived from the urethane groups and further act as cell opening agents during foaming and improve foam quality when used in the concentration according to the invention.

This invention shows several advantages.

The combination of glycolysis and aminolysis in the recycling of polyurethanes leads to a completely different reaction mechanism of the depolymerization of the polyurethanes compared to the state of the art glycolysis. During glycolysis the cleavage proceeds preferably by transesterifaction at the urethane groups and as secondary reactions with a nucleophilic cleavage of the polyureas and a decarboxylation of the urethane groups, both with the formation of primary aromatic amines. Contrary to this, by cleaving the polyurethanes by a combination of glycolic hydroxyl groups and secondary amino groups the urethane groups are transformed to trisubstituted urea groups and because of the basic reaction conditions a nucleophilic reaction at the urea groups of the polyureas takes place in the trace range. During the reaction of the combination of glycol and secondary alkyl amine with the polyurethane, hence, are produced mainly the long chain polyether alcohols from the polyurethanes and the polyureas from the isocyanate and the secondary alkyl amine, i.e. no free primary aromatic amines. The polyureas are present in the mixture of lower molecular weight glycol and long chain polyether alcohol in dissolved and/or dispersed form. By carrying out the process this way the resulting reaction mixture has not only a completely different composition but also the amount of glycol used may be drastically decreased and is, as shown in the examples, in the range of 50 to 20% of the amounts necessary during glycolysis according to the state of the art. By this process a composition of the polyether component results which for the first time allows the production of elastomeric polyurethanes, foams, elastomers, coatings and sealants from recycling polyols without a work-up step. The polyol component with a high percentage of long chain polyether alcohols after reaction with polyisocyanates moves the glass transition temperature of the resulting polyurethanes to lower values, i.e. at room temperature into the elastic region, and this value is not moved to markedly higher temperatures by the low content of low molecular weight diols. By chosing these low molecular weight diols according to the invention with respect to type and amount the upper and lower service temperature of the resultant polyurethanes may be controlled and predetermined already by the depolymerization reaction. Based on this the usage of higher molecular weight glycols in the glycol component is prefered in contrast to the state of the art while the propylene glycols starting with dipropylene glycol are especially suitable since their secondary hydroxyl groups are less reactive than the usual primary hydroxyl groups of the ethylene glycol series thus showing nearly the same reactivity as the hydroxyl groups of the long chain polyether alcohols. From these reasons, the polyols of the present invention show several advantages compared to the state of the art which are based on their specific properties and low cost production.

In a further embodiment of the present invention an economically favorable process is the use of technical non-purified amines or distillation residues from the amine synthesis of aliphatic amines.

The present invention is further illustrated by the following, non-limiting examples.

EXAMPLE 1

In a one liter four-necked flask 100 g diethylene glycol and 40 g of di-n-butylamine are heated to 140° C. With continuous stirring 125 g polyurethane soft foam flakes are introduced within two hours. The temperature is raised to 180° C. and kept for 30 minutes. The mixture is cooled and if necessary degassed. The obtained polyol has a hydroxyl number of 365 mg KOH/g and a viscosity of 3,560 mPas (20° C.). It is used for the production of polyurethane rigid foams and semi-rigid foams.

EXAMPLE 2

In a one liter four-necked flask 150 g triethylene glycol and 35 g of di-n-butylamine are heated to 160° C. With continuous stirring 170 g polyurethane soft foam flakes are introduced within two and a half hours. The temperature is raised.to 195° C. and kept there for one hour. The mixture is cooled and if necessary degassed. The obtained polyol has a hydroxyl number of 326 mg KOH/g and a viscosity of 4,820 mPas (20° C.). It is used for the production of polyurethane rigid foams and semi-rigid foams.

EXAMPLE 3

In a six liter four-necked flask 600 g diethylene glycol and 250 g of di-n-butylamine are heated to 160° C. With continuous stirring 1750 g polyurethane soft foam flakes are introduced within three hours. The temperature is raised to 200° C. and kept there for two hours. The mixture is cooled and if necessary degassed. The obtained polyol has a hydroxyl number of 382 mg KOH/g and a viscosity of 9,500 mPas (200C). It is used for the production of polyurethane rigid foams and semi-rigid foams.

EXAMPLE 4

In a six liter four-necked flask 1000 g polyethylene glycol 400 and 64 g of di-n-butylamine are heated to 150° C. With continuous stirring 1250 g polyurethane soft foam flakes are introduced within two hours. The temperature is raised to 190° C. and kept there for three hours. The mixture is cooled and if necessary degassed. The obtained polyol has a hydroxyl number of 326 mg KOH/g and a viscosity of 4,480 mPas (20° C.). It is used for the production of polyurethane rigid foams and semi-rigid foams.

EXAMPLE 5

In a 2,5 liter four-necked flask 200 g polyethylene glycol 400, 150 g of dipropylene, glycol and 80 g of di-n-butylamine are heated to 1500C. With continuous stirring 625 g polyurethane soft foam flakes are introduced within four hours. The temperature is raised to 210° C. and kept there for two hours. The mixture is cooled and if necessary degassed. The obtained polyol has a hydroxyl number of 288 mg KOH/g and a viscosity of 1,880 mPas (20° C.). It is used for the production of polyurethane rigid foams and semi-rigid foams.

EXAMPLE 6

In a one liter four-necked flask 150 g polyethylene glycol 400, 50 g dipropylene glycol, and 70 g of di-n-butylamine are heated to 150° C. With continuous stirring 550 g polyurethane soft foam flakes are introduced within three hours. The temperature is raised to 200° C. and kept there for two hours. The mixture is cooled and if necessary degassed. The obtained polyol has a hydroxyl number of 221 mg KOH/g and a viscosity of 5,640 mPas (20° C.). It is used for the production of polyurethane rigid foams and semi-rigid foams.

EXAMPLE 7

In a 2,5 liter four-necked flask 290 g dipropylene glycol and 45 g of di-n-butylamine are heated to 180° C. With continuous stirring 750 g polyurethane soft foam flakes are introduced within three hours. The temperature is raised to 200° C. and kept there for two hours. The mixture is cooled and if necessary degassed. The obtained polyol has a hydroxyl number of 290 mg KOH/g and a viscosity of 8,500 mPas (20° C.). It is used for the production of polyurethane rigid foams and semi rigid foams.

EXAMPLE 8

In a 2,5 liter four-necked flask 290 g dipropylene glycol and 53 g of di-n-butylamine are heated to 150° C. With continuous stirring 850 g polyurethane soft foam flakes are introduced within three hours. The temperature is raised to 210° C. and kept there for two hours. The mixture is cooled and if necessary degassed. The obtained polyol has a hydroxyl number of 276 mg KOH/g and a viscosity of 4,200 mPas (20° C.). It is used for the production of polyurethane rigid foams and semi-rigid foams.

What is claimed is:

1. A process for producing polyols by depolymerization of polyurethane wastes in the presence of hydroxyl group containing compounds at elevated temperatures comprising the steps of:

introducing polyurethane wastes into a mixture of at least one diol and at least one secondary alkyl amine, and reacting said polyurethane wastes with said mixture of at least one diol having a molecular weight of 108 to 800 and at least one secondary alkyl amine at temperatures in the range of 120 to 220° C.;

wherein the weight ratio of said at least one diol to said secondary alkyl amine is between 1:1 to 10:1, and the weight ratio of said mixture of diol and secondary alkyl amine to polyurethane is up to 1:12.

2. The process according to claim 1 werein said at least one diol is diethylene glycol.

3. The process according to claim 1 wherein said at least one diol is triethylene glycol.

4. The process according to claim 1 wherein said at least one diol is tetraethylene glycol.

5. The process according to claim 1 wherein said at least one diol is pentaethylene glycol.

6. The process according to claim 1 wherein said at least one diol is a mixture of ethylene glycols.

7. The process according to claim 1 wherein said at least one diol is a polyethylene glycol having a molecular weight of 180 to 800 or a mixture of said polyethylene glycols.

8. The process according to claim 1 wherein said at least one diol is an oligopropylene glycol having a molecular weight between 134 and 800.

9. The process according to claim 1 wherein said secondary alkyl amine is a crude amine.

10. The process according to claim 1 wherein said secondary alkyl amine is a distillation residue obtained from the synthesis of aliphatic amines.

11. A process for producing polyols by depolymerization of polyurethane wastes in the presence of hydroxyl group containing compounds at elevated temperatures comprising the steps of:
gradually reacting polyurethane soft foams in a mixture of a lower molecular weight polyalkylene glycol and a secondary alkyl amine at a temperature between 120 and 220° C.,
wherein a weight ratio of polyalkylene glycol to secondary alkyl amine is between 3:1 to 10:1, and the weight ratio of the mixture of polyalkylene glycol to secondary alkyl amine to polyurethane soft foam is up to 1:12.

12. A process according to claim 11, wherein the weight ratio of polyalkylene glycol to secondary alkyl amine is between 1:1 to 1:7, and the weight ratio of said mixture of polyalkylene glycol and secondary alkyl amine to said polyurethane rigid foam is up to 1:8.

13. The process according to claim 11 wherein:
said polyalkylene glycol is a polyalkylene glycol having a molecular weight between 108 to 600, and said secondary alkyl amine is a di-n-alkyl amine having an alkyl group chain length of between 2 to 6, and
said temperature is in the range between 130 to 200° C.

14. The process according to claim 1 wherein said secondary alkyl amine is di-n-butylamine.

15. Polyols produced by the process of any one of claims 1 to 14.

16. Polyols produced by the process of depolymerization of polyurethane wastes in the presence of hydroxyl group containing compounds at elevated temperatures comprising the steps of:
introducing polyurethane wastes into a mixture of at least one diol and at least one secondary alkyl amine, and reacting said polyurethane wastes with said mixture of at least one diol and at least one secondary alkyl amine at temperatures in the range of 120 to 220° C.;
wherein the weight ratio of said at least one diol to said secondary alkyl amine is between 1:1 to 10:1, and the weight ratio of said mixture of diol and secondary alkyl amine to polyurethane is up to 1:12,
and wherein said polyols consist essentially of a mixture of high molecular weight, at least two functional polyether polyols as derived from the original polyurethane, at least one low molecular weight diol, at least one two functional polyalkylene glycol, di-and/or polyureas as reaction products from the original polyurethane, tertiary amines from the original polyurethane and polyether silicones from the original polyurethane.

17. Polyols produced by the process of depolymerization of polyurethane wastes in the presence of hydroxyl group containing compounds at elevated temperatures comprising the steps of:
introducing polyurethane wastes into a mixture of at least one diol and at least one secondary alkyl amine, and reacting said polyurethane wastes with said mixture of at least one diol and at least one secondary alkyl amine at temperatures in the range of 120 to 220° C.;
wherein the weight ratio of said at least one diol to said secondary alkyl amine is between 1:1 to 10:1, and the weight ratio of said mixture of diol and secondary alkyl amine to polyurethane is up to 1:12,
and wherein said polyols consist of a mixture of three functional high molecular weight polyether alcohols of average molecular weight between 2,500 and 10,000 from polyurethane foams, one or more low molecular weight diols of molecular weight between 108 and 800, di-and/or polyureas from the polyurethane foam, tertiary amines and polyether silicones both from the originally used polyurethane.

18. Polyols produced by the process of depolymerization of polyurethane wastes in the presence of hydroxyl group containing compounds at elevated temperatures comprising the steps of:
introducing polyurethane wastes into a mixture of at least one diol and at least one secondary alkyl amine, and
reacting said polyurethane wastes with said mixture of at least one diol and at least one secondary alkyl amine at temperatures in the range of 120 to 220° C.;
wherein the weight ratio of said at least one diol to said secondary alkyl amine is between 1:1 to 10:1, and the weight ratio of ksaid mixture of diol and secondary alkyl amine to polyurethane is up to 1:12,
and wherein said poluols consist of a mixture of 35 to 60 weight percent nominally three functional high molecular weight polyether alcohols of average molecular weight between 2,500 and 10,000, 10 to 20 weight percent di-and/or polyureas, 0.001 to 1 weight percent tertiary amines, 0.1 to 5 weight percent polyether silicones derived from the original polyurethane, and 5 to 10 weight percent of one or a mixture of low molecular weight diols.

19. A process for producing polyols by depolymerization of polyurethane, wastes in the presence of hydroxyl group containing compounds at elevated temperatures comprising the steps of:
gradually reacting polyurethane elastomers or microcellular elastomers with a mixture of a diol and at least one secondary alkyl amine at a temperature between 120 and 220° C.,
wherein a weight ratio. of said diol to said secondary alkyl amine is between 1:2 to 1:9, and the weight ratio of said mixture of said diol and said. secondary alkyl amine to said polyurethane elastomers or microcellular elastomers is up to 1:9.

* * * * *